Nov. 16, 1948.　　　　G. L. KAMPA　　　　2,454,182
CONTROL DEVICE FOR ROTARY BLADE UNITS
Filed April 27, 1945
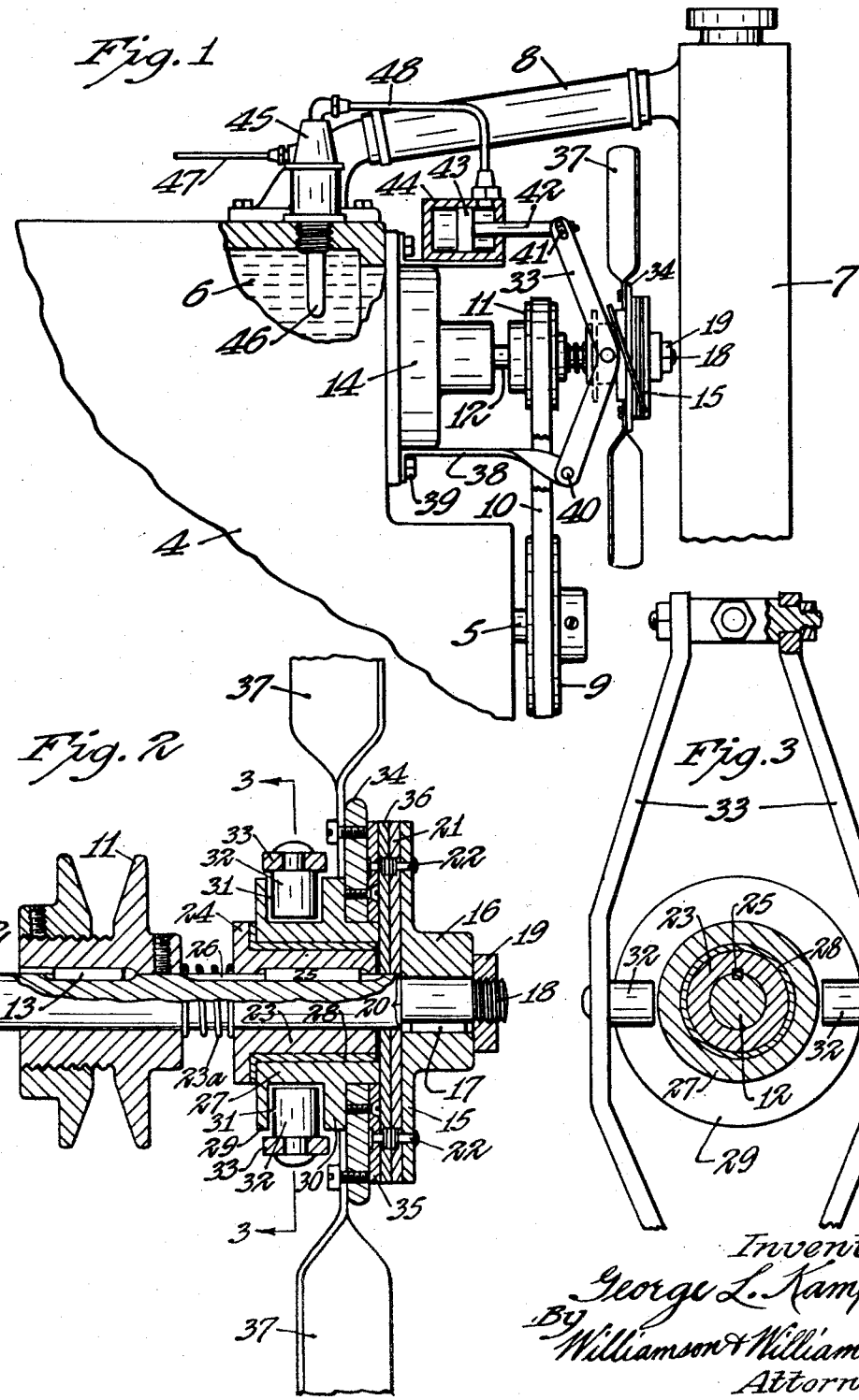
Inventor
George L. Kampa
By Williamson & Williamson
Attorneys Patented Nov. 16, 1948

2,454,182

UNITED STATES PATENT OFFICE 2,454,182

CONTROL DEVICE FOR ROTARY BLADE UNITS

George L. Kampa, Minneapolis, Minn.

Application April 27, 1945, Serial No. 590,689

6 Claims. (Cl. 123—178)

1

This invention relates to fan control mechanism and is particularly adapted for use in connection with internal combustion engines for automotive vehicles although it is contemplated that the invention may also be adapted to other structures wherein fans or other rotary air screws are utilized.

In connection with internal combustion engines for motor vehicles and the like it is frequently desirable to initially operate the engine with the dissipation of as little heat as possible so that the engine will more quickly come up to its normal running temperature, and also so that the ordinary liquid cooling system of the internal combustion engine will be brought up to a desired temperature so that a vehicle heating system connected to the cooling system of the engine will more quickly be in an operative condition for heating the interior of the vehicle.

In automotive vehicles such as private passenger cars and buses it is frequently customary to heat the interior or passenger compartment of the vehicle with the liquid used to cool the engine in the vehicle power plant. When first starting such a vehicle in cold weather it takes a considerable time for the heat generated by the engine to in turn heat the liquid in its cooling system to a sufficient degree to provide heat for the interior of the vehicle.

It is an object of the invention to provide a fan control mechanism which will render the ventilating or cooling fan of the engine inoperative when the engine is first started and to keep it inoperative until the liquid in the engine cooling system has reached a pre-determined temperature, whereupon the fan will be actuated to prevent the engine from overheating during its operation.

Another object of the invention is to provide a fan unit combined with a clutch which can be engaged and disengaged if desired to rotate the fan or disconnect the same, wherein after initial rotation of the fan, the tendency of the fan to pull forwardly in its rotation will maintain the clutch in proper positive engagement and prevent slippage thereof.

Another object of the invention is to provide a fan and clutch unit of the type set forth in the preceding paragraph wherein the clutch is disengaged to render the fan inoperative in response to temperature differentials in the engine cooling system.

A further object of the invention is to provide a construction of the type described which can be readily incorporated in an internal combustion system and wherein the fan clutch unit is readily accessible for replacement and/or repair.

The above and other objects and advantages of the invention will more fully appear from the following description made in connection with the accompanying drawings, wherein like reference characters refer to the same parts throughout the views, and, in which:

Figure 1 is a partial side elevation of an internal combustion engine and cooling system therefor showing the portions thereof in section to illustrate interior structure;

Figure 2 is an enlarged longitudinal sectional view through the fan mounting and clutch unit with the fan blades broken away; and Figure 3 is a section taken approrimately on the line 3—3 of Figure 2.

In Figure 1 there is shown an internal combustion engine 4 having a crank shaft 5 extending from the lower forward portion thereof. The upper corner portion of the engine 4 is broken away to show the water jacket 6 which forms part of the engine cooling system. As is well known, the water jacket 6 is in flow communication with a cooling radiator 7, the upper water hose connection 8 being illustrated.

Mounted on the forward end of the crank shaft 5 is a pulley 9 connected by a V belt 10 to a pulley 11 which is secured on a water pump shaft 12 by means of a key 13 shown in Figure 2. A conventional water pump 14 is shown in Figure 1.

Mounted on the forward end of the pump shaft 12 is a clutch plate 15 having a hub 16 which is secured on said shaft 12 by a key 17. The extreme end of the shaft 12 is threaded as at 18 to receive a nut 19 which secures the clutch plate hub 16 between it and a shoulder 20 on the shaft 12. The clutch plate 15 on its inner or left hand side is provided with a suitable clutch facing 21 which may be secured as by rivets 22.

A clutch sleeve 23 having a flanged end 24 is mounted for sliding movement on the pump shaft 12. Said clutch sleeve 23 is connected for rotation with the shaft 12 by means of a key 25 which is adapted to ride in a keyway 26 extending lengthwise of said shaft 12.

Interposed between the V belt pulley 11 and the flange 24 on the sleeve 23 is a helical spring 23a which normally urges the flanged sleeve 23 to the right or forwardly as viewed in Figure 2.

Mounted for rotation on the clutch sleeve 23 is an outwardly concentric sleeve 27 and suitable bearing material 28 is located between the sleeves 23 and 27 to permit free rotation of the sleeve 27 on and about the inner sleeve 23. The sleeve 27 has a pair of radial flanges 29 and 30 defining a channel 31 adapted to receive shift fingers 32 mounted on a split yoke 33.

Mounted on the rotating sleeve 27 forwardly or to the right of the radial flange 30 is a flange or ring 34 on whose forward or right hand face is secured a clutch plate 35 having a clutch facing 36 secured thereto in opposed relation to the clutch facing 21 on the clutch plate or disc 15 mentioned above. Also secured to the flange or collar 34 are fan blades 37.

Referring to Figure 1 there is shown a bracket 38 which is secured to the lower portion of the water pump 14 as indicated by the bolt 39. The bracket 38 has pivotally connected thereto at 40 the lower end of the yoke 33. The upper end of said yoke 33 is pivotally connected at 41 to a piston rod 42 which carries a piston 43 located in a cylinder 44.

Mounted on the engine 4 is a thermostatic valve unit 45 which includes a heat responsive element 46 which extends into the engine water jacket 6. The interior of the valve 45 is not shown, but there is shown a conduit 47 leading to the valve 45 and a second conduit 48 leading from the valve 45 to the interior of the cylinder 44 at the right hand side of the piston 43. The valve 45 is such that it will be held normally open but will close to cut off communication between the conduits 47 and 48 when the temperature of the liquid in the water jacket 6 has reached a predetermined maximum. The conduit 47 is adapted to be connected to a source of fluid pressure such as a compressed air storage tank used in a vehicle air brake system.

When the engine 4 is cold and first started the heat responsive element 46 in the thermostatic valve 45 will keep the valve 45 open and as soon as any air pressure is built up in the air brake system of the vehicle said air pressure will force the piston 43 in the cylinder 44 to the left and cause the yoke 33 to be swung to the left or rearwardly against the action of the spring 23a to disengage the cooperating clutch faces 21 and 36. The pump shaft 12 will, of course, be rotated since it is driven from the engine crank shaft 5 by the V belt 10 but the fan blades 37 will not rotate as long as the clutch elements are disengaged.

When the liquid system engine water jacket 6 reaches a desired degree of heat the valve 45 will close cutting off pressure from the air brake system, whereupon the helical spring 23a on the pump shaft will move the fan and its attached movable clutch portion forwardly or to the right, at the same time moving the piston 43 to the right in the cylinder 44. This action of the spring 23a will initially engage the cooperating clutch faces 21 and 26 and cause the fan 37 to begin rotation. As the speed of rotation of the fan 37 increases it will cause the fan to tend to pull forwardly and since the relatively movable clutch plates are forward of the fan such clutch plates will be brought into even more positive engagement so that there is no slippage in the clutch assembly. This feature of maintaining proper engagement of the clutch by reason of the natural action of the fan 37 is one of the important features of the invention. By reason of this arrangement it is possible to construct a relatively light and simple structure for engaging and disengaging the clutch and at the same time the clutch will be maintained in firm engagement so long as the temperature of the engine cooling system remains at or above the above mentioned degree of heat.

Should the vehicle be initially started and warmed in a comparatively warm enclosure the fan will begin operation as described above. If the vehicle is driven outside into an extremely cold temperature sufficient to considerably lower the heat of the liquid in the water jacket 6, the temperature responsive valve 45 will reopen and force the piston 43 to the left thereby disengaging the fan 37 and rendering it inoperative. If at any time the engine should again become sufficiently warm the air pressure would be cut off and the clutch spring 23a would cause the clutch to engage and resume rotation of the fan 37.

The invention can be utilized with or without the vehicle heating system merely to cause the engine 4 to come up to a proper operating temperature as quickly as possible and thus permit more prompt and ready flow of lubricating oil in the engine so that wear on moving parts is lessened.

I have described the clutch disengaging mechanism as being connected to an air pressure brake system but, of course, it is possible to actuate it by hand or from the negative intake pressure in the engine. There might also be a solenoid actuation of the clutch. In the latter case it would only be necessary to move the connection of the conduit 48 with the cylinder 44 from the right hand side of the piston 43 to the left hand side thereof. By reason of the structure shown in the clutch assembly it is possible to readily remove the right hand clutch 15 to expose both clutch facings 21 and 36 for inspection or replacement if they are worn. However, by reason of the positive clutch engagement maintained by the rotating fan 37 through its tendency to pull forwardly the clutch facings 21 and 36 can be used for unusually long periods of time without requiring replacement due to wear.

It will, of course, be understood that various changes may be made in the form, details, arrangement and proportions of the various parts without departing from the scope of my invention.

What I claim is:

1. In a device of the class described, a first clutch element, a second clutch element movable into and out of engagement with said first clutch element, a fan connected to one of said clutch elements for rotation therewith, said clutch elements being located forwardly of said fan and being in such relative position that rotation of said fan will maintain its connected clutch element in operative engagement with the other of said clutch elements, and means for shifting said clutch elements out of engagement with each other.

2. In a device of the class described, a shaft, a pair of clutch elements on said shaft, one of said clutch elements being shiftable on said shaft for engaging and disengaging the other of said clutch elements, a fan having a connection with said movable clutch element, and a connection between said fan and its clutch element being arranged to cause movement of said movable clutch element to engage with the other of said clutch elements in response to the tendency of said fan to move forwardly upon rotation thereof.

3. The combination with a heat producing mechanism, of a rotary fan, a clutch device mounted for axial movement with a cooperating portion of said clutch device, a heat responsive unit in heat exchange relationship with said heat producing mechanism, and connected to said fan and its connected clutch portion to disengage said connected clutch portion and fan from the other portion of said clutch responsive to changes in temperature, and said fan being so related to said clutch that initial engagement of the clutch and rotation of the fan will urge the clutch into closer operative coupling when said temperature responsive device is inoperative to disengage from said fan and its connected clutch portion.

4. A cooling fan unit for internal combustion engines and the like comprising, a pair of cooperating clutch members having relative movement for engagement and disengagement thereof, a fan having a forward side and a rearward side, means for bringing said clutch members into initial engagement, and said clutch members being located at the forward side of said fan unit, said fan unit being mounted on one of said clutch members for axial movement therewith, whereby initial engagement of said clutch and rotation of said fan unit will cause said fan to bring said clutch units into more positive engagement.

5. A cooling fan unit for internal combustion engines and the like comprising, a pair of cooperating clutch members having relative movement for engagement and disengagement thereof, a fan having a forward side and a rearward side, said clutch members being located at the forward side of said fan and said fan being supported by the nearer of said clutch members, a device for moving said fan and the clutch member supporting the same away from the other of said clutch member, and a spring device for urging said clutch members into initial engagement.

6. The combination with a heat producing mechanism, of a rotary fan, a clutch device having relatively movable cooperating portions, said fan being connected to one of said clutch portions, a spring device yieldably urging said clutch portions into engagement, a heat responsive unit in heat exchange relationship with said heat producing mechanism, said rear responsive unit being connected to said fan and its connected clutch portion to disengage said connected clutch portion and fan from the other portion of said clutch device responsive to changes in temperature and against the action of said spring device, and said fan being so related to said clutch that initial engagement of the clutch and rotation of the fan will urge the clutch into closer operative coupling when said temperature responsive device is inoperative to disengage from said fan and its connected clutch portion.

GEORGE L. KAMPA.

REFERENCES CITED

The following references are of record in the file of this patent:

UNITED STATES PATENTS

| Number | Name | Date |
|---|---|---|
| 1,433,399 | Modine | Oct. 24, 1922 |
| 1,523,293 | Rudio | Jan. 13, 1925 |
| 1,820,035 | Stokes | Aug. 25, 1931 |
| 1,837,564 | McCaleb | Dec. 22, 1931 |
| 2,022,709 | Embery et al. | Dec. 3, 1935 |

FOREIGN PATENTS

| Number | Country | Date |
|---|---|---|
| 366,588 | Germany | Jan. 8, 1923 |